United States Patent
Edwards et al.

(10) Patent No.: US 7,200,219 B1
(45) Date of Patent: Apr. 3, 2007

(54) DYNAMICALLY ALLOCATING SERVER RESOURCES TO COMPETING CLASSES OF WORK BASED UPON ACHIEVEMENT OF SERVICE GOALS

(75) Inventors: Thomas J. Edwards, Seattle, WA (US); David C. Mullen, Newcastle, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/247,893

(22) Filed: Feb. 10, 1999

(51) Int. Cl.
  *H04M 3/00* (2006.01)
  *H04M 5/00* (2006.01)
(52) U.S. Cl. .......................... 379/265.01; 379/265.12; 379/265.13
(58) Field of Classification Search ................ 379/265.01–265.14, 266.01–266.1, 309; 709/310
See application file for complete search history.

(56) References Cited

U.S. PATENT DOCUMENTS

| | | | |
|---|---|---|---|
| 4,163,124 A | 7/1979 | Jolissaint ................. | 179/18 D |
| 4,737,983 A | 4/1988 | Frauenthal et al. ......... | 379/221 |
| 4,797,911 A | 1/1989 | Szlam et al. ............. | 379/88.22 |
| 4,894,857 A | 1/1990 | Szlam et al. ............. | 379/67.1 |
| 5,001,710 A | 3/1991 | Gawrys et al. ........... | 370/110.1 |
| 5,097,528 A | 3/1992 | Gursahaney et al. ......... | 379/67 |
| 5,101,425 A | 3/1992 | Darland ................. | 379/34 |
| 5,164,983 A | 11/1992 | Brown et al. ............ | 379/265 |
| 5,210,789 A | 5/1993 | Jeffus et al. ............ | 379/127 |
| 5,274,700 A | 12/1993 | Gechter et al. ........... | 379/210 |

(Continued)

FOREIGN PATENT DOCUMENTS

CA   2143198   1/1995

(Continued)

OTHER PUBLICATIONS

U.S. Appl. No. 09/235,065, Denton et al., Jan. 21, 1999.

(Continued)

*Primary Examiner*—William J. Deane, Jr.
(74) *Attorney, Agent, or Firm*—Sheridan Ross P.C.

(57) ABSTRACT

A facility for adjusting a number of servers assigned to server pools for performing certain work types on the basis of unmet service needs in a work processing facility. Servers may include service agents, both human and robotic. A server assignor and corresponding server assignment method may each be employed in a work distributor or an automatic call distributor ("ACD") to conditionally adjust server availability in server pools. The server assignor compares a composite preference value for a work type against each server's threshold value for the work type. When the server assignor determines that the composite preference value is greater than or equal to a server's threshold value, then the server assignor indicates that the server may be included in the server pool for that work type. Each server has preference values and threshold values for different kinds of work. The magnitude of a preference value represents an affinity for the work type. The server's threshold value represents a reluctance to perform work having that work type. The server does not normally receive work for which the preference value is less than the threshold value, unless the server assignor determines that the composite preference value exceeds the server's threshold value for that work type. The server assignor and corresponding server assignment method may compute the composite preference value from a number of user-selectable inputs and utilize a number of user-selectable functions.

40 Claims, 14 Drawing Sheets

| Server ID (201) | Work Type (202) | Server Preference For Work Type (203) | Server Threshold For Work Type (204) | |
|---|---|---|---|---|
| 100 | Calls From Prospects | 8 | 9 | 205 |
| 100 | Claims Calls | 4 | 3 | 206 |
| 101 | Calls From Prospects | 5 | 9 | 207 |
| 101 | Claims Calls | 6 | 7 | 208 |
| 101 | Calls From Preferred Customers | 0 | 0 | 209 |

(200)

U.S. PATENT DOCUMENTS

| | | |
|---|---|---|
| 5,278,898 A | 1/1994 | Cambray et al. ............ 379/266 |
| 5,335,268 A | 8/1994 | Kelly, Jr. et al. ............ 379/112 |
| 5,390,243 A | 2/1995 | Casselman et al. .......... 379/265 |
| 5,436,965 A | 7/1995 | Grossman et al. ........... 379/266 |
| 5,444,774 A | 8/1995 | Friedes ........................ 379/266 |
| 5,469,503 A | 11/1995 | Butensky et al. ............ 379/265 |
| 5,469,504 A | 11/1995 | Blaha ......................... 379/265 |
| 5,473,773 A | 12/1995 | Aman et al. ................. 395/650 |
| 5,479,497 A | 12/1995 | Kovarik ....................... 379/265 |
| 5,500,795 A | 3/1996 | Powers et al. .............. 364/401 |
| 5,504,894 A | 4/1996 | Ferguson et al. ........... 395/650 |
| 5,530,744 A | 6/1996 | Charalambous et al. .... 379/265 |
| 5,537,542 A | 7/1996 | Eilert et al. ............. 395/184.01 |
| 5,544,232 A | 8/1996 | Baker et al. ............. 379/88.25 |
| 5,546,452 A | 8/1996 | Andrews et al. ............ 379/219 |
| 5,592,542 A | 1/1997 | Honda et al. ................ 379/265 |
| 5,611,076 A | 3/1997 | Durflinger et al. .......... 395/613 |
| 5,642,515 A | 6/1997 | Jones et al. .................. 395/727 |
| 5,684,964 A | 11/1997 | Powers et al. .............. 395/211 |
| 5,689,698 A | 11/1997 | Jones et al. .................. 395/604 |
| 5,703,943 A | 12/1997 | Otto ....................... 379/265.11 |
| 5,713,014 A | 1/1998 | Durflinger et al. .......... 395/604 |
| 5,742,675 A | 4/1998 | Kilander et al. ............. 379/265 |
| 5,748,468 A | 5/1998 | Notenboom et al. ........ 364/132 |
| 5,749,079 A | 5/1998 | Yong et al. .................. 707/100 |
| 5,752,027 A | 5/1998 | Familiar ...................... 395/614 |
| 5,754,639 A | 5/1998 | Flockhart et al. ............ 379/221 |
| 5,754,841 A | 5/1998 | Carino, Jr. .................. 395/603 |
| 5,757,904 A | 5/1998 | Anderson .................... 379/265 |
| 5,794,250 A | 8/1998 | Carino, Jr. et al. .......... 707/104 |
| 5,796,393 A | 8/1998 | MacNaughton et al. .... 345/329 |
| 5,825,869 A | 10/1998 | Brooks et al. ............... 379/265 |
| 5,838,968 A | 11/1998 | Culbert ........................ 395/674 |
| 5,881,238 A | 3/1999 | Aman et al. ............ 395/200.56 |
| 5,889,956 A | 3/1999 | Hauser et al. .......... 395/200.56 |
| 5,903,641 A | 5/1999 | Tonisson ..................... 379/266 |
| 5,915,012 A | 6/1999 | Miloslavsky ............ 379/265.02 |
| 5,926,538 A | 7/1999 | Deryugin et al. ............ 379/265 |
| 5,930,786 A | 7/1999 | Carino, Jr. et al. .............. 707/4 |
| 5,937,051 A | 8/1999 | Hurd et al. .................. 379/212 |
| 5,937,402 A | 8/1999 | Pandit ............................ 707/4 |
| 5,940,496 A | 8/1999 | Gisby et al. ................. 379/265 |
| 5,948,065 A | 9/1999 | Eilert et al. .................. 709/226 |
| 5,960,073 A | 9/1999 | Kikinis et al. ............... 379/265 |
| 5,963,635 A | 10/1999 | Szlam et al. ................. 379/309 |
| 5,970,132 A | 10/1999 | Brady ......................... 379/212 |
| 5,974,135 A | 10/1999 | Breneman et al. ........... 379/265 |
| 5,974,462 A | 10/1999 | Aman et al. ................. 709/225 |
| 5,987,117 A | 11/1999 | McNeil et al. ............... 379/265 |
| 5,991,392 A | 11/1999 | Miloslavsky ................ 379/265 |
| 5,996,013 A | 11/1999 | Delp et al. ................... 709/226 |
| 5,999,963 A | 12/1999 | Bruno et al. ................. 709/104 |
| 6,011,844 A | 1/2000 | Uppaluru et al. ....... 379/220.01 |
| 6,038,293 A | 3/2000 | McNerney et al. ...... 379/88.19 |
| 6,044,144 A | 3/2000 | Becker et al. ............... 379/265 |
| 6,044,355 A | 3/2000 | Crockett et al. ................ 705/8 |
| 6,052,723 A | 4/2000 | Ginn ........................... 709/223 |
| 6,055,308 A | 4/2000 | Miloslavsky et al. ....... 379/265 |
| 6,115,462 A | 9/2000 | Servi et al. .................. 379/221 |
| 6,154,769 A | 11/2000 | Cherkasova et al. ........ 709/207 |
| 6,175,564 B1 | 1/2001 | Miloslavsky et al. ....... 370/352 |
| 6,178,441 B1 | 1/2001 | Elnozahy ..................... 709/203 |
| 6,185,292 B1 | 2/2001 | Miloslavsky ................ 379/265 |
| 6,215,865 B1 | 4/2001 | McCalmont ........... 379/212.01 |
| 6,226,377 B1 | 5/2001 | Donaghue, Jr. ............. 379/265 |
| 6,229,819 B1 | 5/2001 | Darland et al. ............. 370/467 |
| 6,230,183 B1 | 5/2001 | Yocom et al. .............. 709/105 |
| 6,233,333 B1 | 5/2001 | Dezonmo .................... 379/266 |
| 6,240,417 B1 | 5/2001 | Eastwick .................... 710/62 |
| 6,263,359 B1 | 7/2001 | Fong et al. .................. 709/103 |
| 6,272,544 B1 | 8/2001 | Mullen ........................ 709/226 |
| 6,278,777 B1 | 8/2001 | Morley ........................ 379/265 |
| 6,356,632 B1 | 3/2002 | Foster et al. ............ 379/265.04 |
| 6,424,709 B1 | 7/2002 | Doyle et al. ................. 379/265 |
| 6,426,950 B1 | 7/2002 | Mistry ......................... 370/352 |
| 6,434,230 B1 | 8/2002 | Gabriel .................. 379/265.01 |
| 6,490,350 B2 | 12/2002 | McDuff et al. ......... 379/265.06 |
| 6,560,649 B1 | 5/2003 | Mullen et al. .............. 709/226 |
| 6,650,748 B1 | 11/2003 | Edwards et al. ....... 379/266.04 |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0 855 826 A2 | 7/1998 |
| EP | 0 863 651 A2 | 9/1998 |
| GB | 2 273 418 | 6/1994 |
| GB | 2 290 192 A | 12/1995 |
| WO | WO 96/07141 | 3/1996 |

OTHER PUBLICATIONS

U.S. Appl. No. 09/264,497, Edwards, Mar. 8, 1999.

"Product Features," *Guide to Call Center Automation*, Brock Control Systems, Inc., Activity Managers Series™, Section 5—Company B120, p. 59, 1992.

"Product Features," *Guide to Call Center Automation*, CRC Information Systems, Inc., Tel-ATHENA, Section 5, Company C520, p. 95, 1992.

Dawson, "NPRI's Powerguide, Software Overview" *Call Center Magazine*(Jun. 1993), p. 85.

"Applications, NPRI's Predictive Dialing Package," *Computer Technology*(Fall 1993), p. 86.

"VAST™, Voicelink Application Software for Teleservicing®," *System Manager User's Guide*, Digital Systems (1994), pp. ii, vii-ix, 1-2, 2-41 through 2-77.

GEOTEL Communications Corporation Web site printout entitled "Intelligent CallRouter Call Flow", 1998.

GEOTEL Communications Corporation Web site Printout entitled "The Intelligent CallRouter Product Overview", Jul. 3, 1997.

GEOTEL Communications Corporation Web site printout entitled "Intelligent CallRouter Product Architecture" Jul. 3, 1997.

Communication dated Dec. 30, 2005 transmitting the European Search Report for counterpart Application No. 00301027.90-2211, 3 pages.

E. Gamma et al., "Design Patterns: Elements of reusable object-oriented software", Addison-Wesley, Reading Massachusetts, 1995.

Examiner's Refusal Decision for Japanese Patent Application No. 2000-34267 dated Mar. 9, 2005, with translation, 4 pages.

| Server ID | Work Type | Server Preference For Work Type | Server Threshold For Work Type |
|---|---|---|---|
| 100 | Calls From Prospects | 8 | 9 |
| 100 | Claims Calls | 4 | 3 |
| 101 | Calls From Prospects | 5 | 9 |
| 101 | Claims Calls | 6 | 7 |
| 101 | Calls From Preferred Customers | 0 | 0 |

*Fig. 2*

| Server ID (301) | Work Type (302) | Server Preference For Work Type (303) | Server Threshold For Work Type (304) | Composite Preference For Work Type (305) |
|---|---|---|---|---|
| 100 | Calls From Prospects | 8 | 9 | 10 |
| 100 | Claims Calls | 4 | 3 | 8 |
| 101 | Calls From Prospects | 5 | 9 | 7 |
| 101 | Claims Calls | 6 | 7 | 10 |
| 101 | Calls From Preferred Customers | 0 | 0 | 0 |

| Work Type — 601 | Available Servers — 602 |
|---|---|
| Calls From Prospects | 42 — 603 |
| Claims Calls | 30 — 604 |
| Calls From Preferred Customers | 15 — 605 |

Fig. 6B

| Work Type — 601 | Available Servers — 602 |
|---|---|
| Calls From Prospects | 48 — 603 |
| Claims Calls | 24 — 604 |
| Calls From Preferred Customers | 15 — 605 |

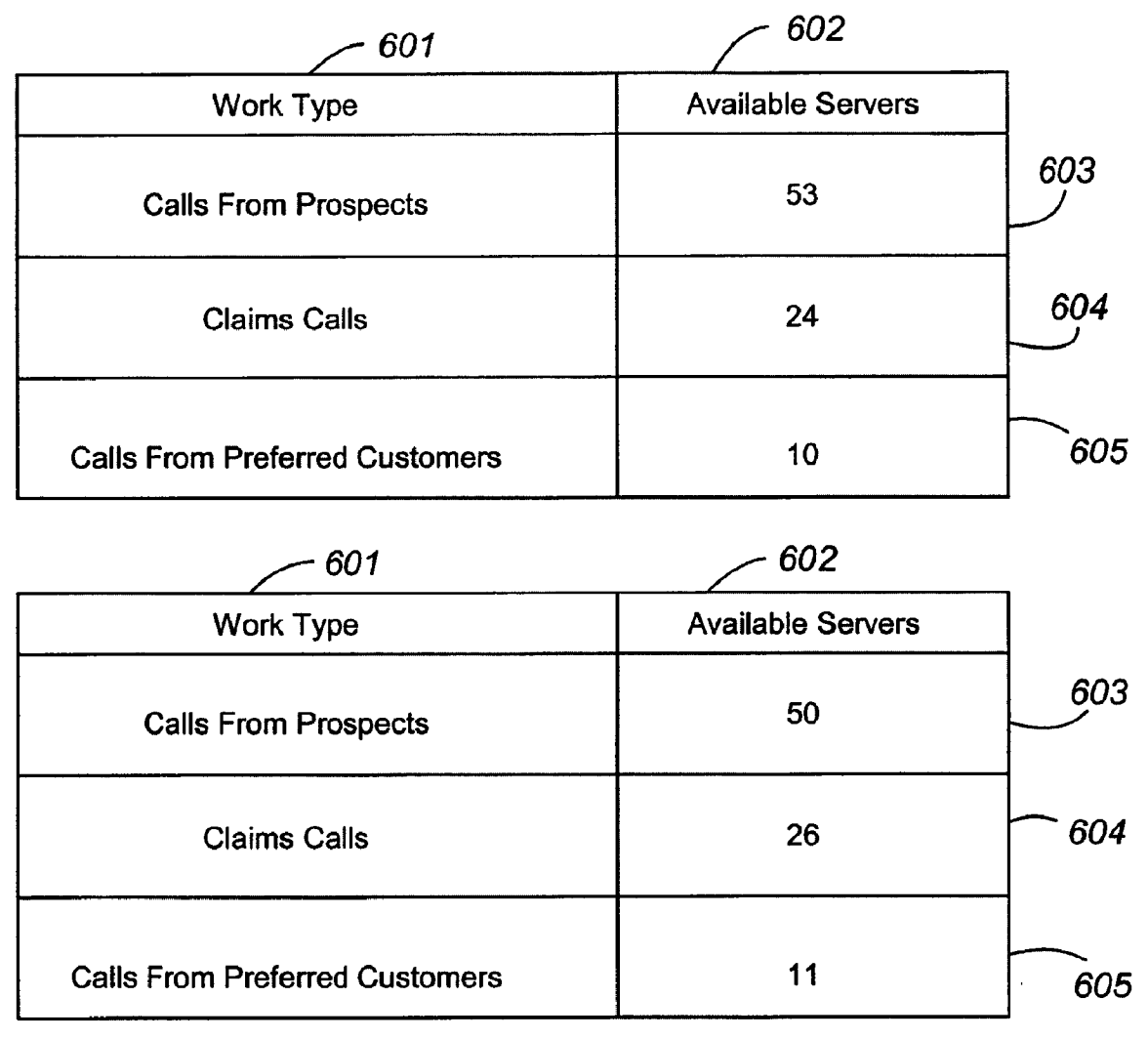

| Work Type — 601 | Available Servers — 602 |
|---|---|
| Calls From Prospects | 53 |
| Claims Calls | 24 |
| Calls From Preferred Customers | 10 |

*Fig. 6C*

| Work Type — 601 | Available Servers — 602 |
|---|---|
| Calls From Prospects | 50 |
| Claims Calls | 26 |
| Calls From Preferred Customers | 11 |

*Fig. 6D*

| Server ID (301) | Work Type (302) | Server Preference For Work Type (303) | Server Threshold For Work Type (304) | Dynamic Preference Value for Work Type (701) | Composite Preference Value (305) |
|---|---|---|---|---|---|
| 100 | Calls From Prospects | 8 | 9 | 2 | 10 |
| 100 | Claims Calls | 4 | 3 | 4 | 8 |
| 101 | Calls From Prospects | 5 | 9 | 2 | 7 |
| 101 | Claims Calls | 6 | 7 | 4 | 10 |
| 101 | Calls From Preferred Customers | 0 | 0 | 0 | 0 |

| Agent ID 301 | Work Type 302 | Server Preference For Work Type 303 | Server Threshold For Work Type 304 | Composite Preference For Work Type 305 | |
|---|---|---|---|---|---|
| 100 | Calls From Prospects In Western Region | 8 | 9 | 10 | 1001 |
| 100 | Claims Calls From Western Region | 4 | 3 | 8 | 1002 |
| 100 | Calls From Prospects In Central Region | 5 | 9 | 7 | 1003 |
| 100 | Claims Calls From Central Region | 6 | 7 | 10 | 1004 |
| 100 | Public Utility Mandated Calls | 8 | 9 | 20 | 1005 |

1000

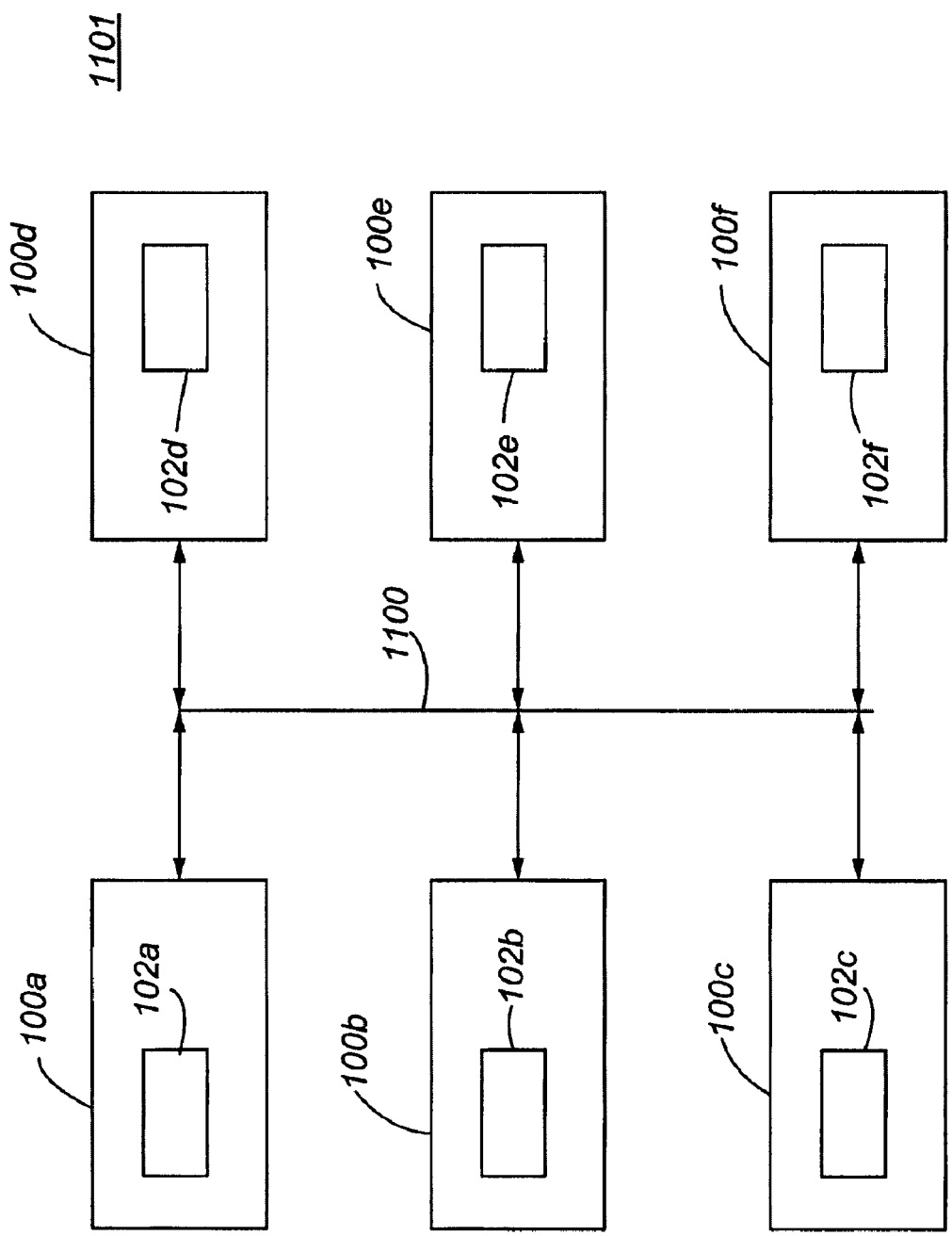

DYNAMICALLY ALLOCATING SERVER RESOURCES TO COMPETING CLASSES OF WORK BASED UPON ACHIEVEMENT OF SERVICE GOALS

TECHNICAL FIELD

The present invention is directed to the field of service provider allocation.

BACKGROUND OF THE INVENTION

Many service organizations need to dynamically allocate their servers in order to attain certain goals. Such allocation is typically performed manually. Servers may include service agents, both human and robotic. Increasingly, external performance measures of service delivered dominate internal cost measures, such as utilization and labor costs. Such external measures often consist of classifying certain transactions into meeting or not meeting desired objectives and determining a proportion of those transactions meeting objectives. Such a proportion is called a service level. The service level is measured over some period of time or over some number of transactions.

Examples of service levels are the percentage of customer problems resolved without further activity, the percentage of dispatched taxicabs that reach the rider within the committed time, the proportion of telephone calls handled by a qualified representative without requiring a transfer or referral to another server, the proportion of telephone calls that can be connected to a server without delay, the proportion of e-mail requests that are answered within 24 hours, the percentage of on-time departures of city buses on a particular bus route on weekdays, the proportion of transactions handled not resulting in a customer complaint, the proportion of preferred customer calls handled by fully qualified servers, the percentage of Spanish customers handled by a server fluent in Spanish, the percentage of telephone calls not abandoned by the customer before connection to a server, the percentage of customer inquiry telephone calls that are not blocked at the central office switch, the percentage of customer sessions with the self-service World Wide Web pages that are not aborted while waiting for a display, the percentage of customer requests via telephone that can be completed immediately while on the phone, the percentage of loan applications processed within one-half hour from the time of the request, and the percentage of priority telephone calls answered within 8 seconds and handled properly by a qualified server, to name a few.

A service organization's goal for a service level in this context is a particular desired value of the service level. The goal is said to be satisfied if the attained service level is at least as high as the desired service level for the goal. Conversely, the goal is said to be unattained if the realized service level is less than the desired service level. For example, the goal of at least 85% of telephone calls from preferred customers each day being answered within 12 seconds would be attained if, among the telephone calls from preferred customers during the current day, 87% were answered within 12 seconds; inversely, if only 84% of such calls are answered within 12 seconds, the goal would be unattained. In this framework the goal is either attained or not. Moreover, no extra benefit is accrued for attaining a service level much higher than the goal.

A service level goal is one commonly used in criteria for contingency actions, including exceptional allocations of resources. Other relevant performance goals in this context may include maximum values for mean wait times, current queue conditions, minimum number of transactions throughput in a work shift, and measures involving various determinable factors indicative of quality service.

The number of server resources allocated to a type of service often affects the service level achieved for that type of service. When such is the case, the operation can usually reallocate servers to the subject work in order to achieve service level goals. Such reallocation generally incurs opportunity cost; however, since service levels for other work suffers. One can often justify this opportunity cost based on an appropriate priority hierarchy as might be established by the enterprise's operating rules.

For example, suppose servers in a call center can handle both loan servicing and sales servicing transactions. When more servers are assigned to sales activities, sales servicing transactions experience a higher service level on answer delay—that is, the amount of time required to answer each sales call declines. Meanwhile, the loan servicing calls are not answered as promptly, reducing the service level for loan servicing transactions. The service organization may rationalize this by saying that loan servicing is relatively less important because it is not very likely that an existing customer will switch loan companies, and that the company presently needs to acquire new customers that could easily take their business to a competitor if their calls are not answered promptly. The service organization wants to satisfy the goal of loan servicing, but not at the expense of failing to reach the goal in sales. When the sales goal is not in jeopardy, but the loan servicing is failing to meet its goal, the service organization desires to allocate more resources to loan servicing. The service organization wants to meet both goals, but the sales goal is more important than the loan servicing goal and so may preempt it. That is, if the operation can only meet one goal it should be the sales goal.

Within a set of servicing goals, there may be goals that relate to work having a short "opportunity window" as well as goals for work having a long opportunity window. An example of short opportunity window work is a telephone call, which if not answered in several tens of seconds may be abandoned by the caller with limited patience. An example of long opportunity window work is a letter from a customer regarding a billing adjustment that has until the next billing cycle to complete. Thus, the operation has a very short time frame for meeting service objectives associated with short opportunity window work while the window of opportunity to achieve service objectives associated with long opportunity window work is much broader. Hence there may be productive operational strategies to temporarily allocate more resources who are performing long opportunity window work to short opportunity window work in order to meet the servicing goals for the short opportunity window work.

Many service organizations need to dynamically allocate their servers to achieve desired results. Manual interventions typically effect such reallocations. Often servers are held in abeyance, not available for certain types of work, although they satisfy the skill profile required for the work type. However, if conditions so warrant they might be assigned to the work type. The server is said to be a backup server with respect to that work in such a case where the server is not usually utilized for that type of work.

The desire to allocate more server resources to an activity is typically contingent upon the alternative activities that the server resources can perform and the demand for such alternative activities. Each of these alternative activities is also potentially associated with various service levels, each of which has a goal and a level of attainment. Consequently, the reallocation of resources can depend upon service measures for all alternative work types associated with each of the server resources. Manually performing such a potentially complex allocation function can produce significantly suboptimal results. Often, manual allocation comes too late and leads to more problems when the reallocated servers are not returned to their preferred work soon enough.

Most automatic call distributors ("ACDs") have a feature that is generically called "call overflow." Call overflow makes a server group available for a call queue contingent upon selected conditions. However, ACDs generally lack facilities for holding a server in abeyance from receiving calls contingent upon appropriate dynamic conditions. Generally, the ACD requires explicit control of the process of getting a call to a server but provides little explicit control of the process of getting a server to a call. However, the server's viewpoint of a work type is often critical in choosing between alternative work in order to maximize the aggregate completion of work.

The advent of skills-based routing, in which the skills of each individual server are considered in allocating servers, complicates the situation. Skills-based routing cannot tolerate simplifying fragmentation of resources into monolithic pools where distinguishing skills are ignored. For this reason, conventional ACDs as well as workflow automation systems fail to meet this need.

Work distribution systems may force users to manipulate server "skills" in order to effect a reallocation of servers, as discussed above. ACDs and other automatic work distributors may report "service levels" only on skill demands or on some kind of queuing point on a distribution map. However, sometimes a "skill" is actually a type of work instead of an attribute of the server's capabilities. These conventional solutions constitute potentially severe limitations on the monitoring and control of service levels important to the service organization.

In this environment, the service organization wants to provide preferential treatment to work activities in a hierarchy that ensures that the best work item is given to a server in view of service goals and the stated priorities of these goals. An automated system that dynamically expands a pool of servers available for work types based on the attainment or non-attainment of determinable service goals pertaining to the work types in a work processing facility would have significant utility.

SUMMARY OF THE INVENTION

The present invention provides a facility for adjusting a number of servers available for particular work types based on unmet or jeopardized service needs in a work processing facility. Servers may include service agents, both human and robotic. A server assignor and a corresponding server assignment method may each be employed in a work distributor to conditionally adjust the assignment of servers to server pools. An example of a common work distributor where work items are represented by incoming phone calls is an automatic call distributor ("ACD").

The server assignor compares a composite preference value for a work type against each server's threshold value for the work type, according to an embodiment of the invention. When the server assignor determines that the composite preference value is greater than or equal to a server's threshold value, then the server assignor indicates that the server may be included in the server pool for that work type. Each server has a preference value and a threshold value for different work types. The magnitude of a preference value represents an affinity for the work type. The server's threshold value represents a reluctance to perform work of that work type. Servers do not normally receive work having a work type for which their preference value is less than their threshold value for this work type, unless the server assignor has determined that the server's composite preference value exceeds the server's threshold value for that work type, according to an embodiment of the invention.

The server assignor and corresponding server assignment method may compute the composite preference value from a number of user-selectable inputs and utilize a number of user-selectable functions, according to an embodiment of the invention. The composite preference value may include a dynamic preference value that has been calculated from inputs such as service levels, queue conditions, a desired service level, alarm conditions, answer delays, call abandonment rates, and operator interventions. In one embodiment of the invention, the composite preference value function's inputs comprise the server's preference value for the work type and a dynamic preference value for that work type. Accordingly, the composite preference value in this embodiment considers both the server's specific preferences for various kinds of work and the work processing facility's current general preferences for handling various kinds of work based on broader considerations including goals.

The server assignor may utilize any of myriad composite preference value functions that receive as inputs the work type's dynamic preference value and the server's preference value for the work type, according to an embodiment of the invention. A simple composite preference value function comprises summing the server's preference value for the work type and the work type's dynamic preference value.

The server assignor and its corresponding server assignment method apply a dynamic expediency demand of work to effect an expansion in the server pool for work types having unmet goals. The server assignor and server assignment method allow a work processing facility to utilize backup servers commensurate with the effect of operational rules for expediting work. The server assignor and server assignment method enable the utilization of backup servers without undue constraints upon the work processing facility and the server organization.

BRIEF DESCRIPTION OF THE DRAWINGS

An embodiment of the invention will be described below relative to the following figures. Note that similar elements and steps in the figures have the same reference number.

FIG. 2 is a server preference table 200 illustrating the preferences of various servers for the various work types 202 that represent types of work performed in the work processing facility, according to an embodiment of the invention.

FIG. 3 is a diagram showing a table 300 illustrating server preferences and thresholds for work types performed in the work processing facility coupled with a composite preference value for the work type, according to an embodiment of the invention.

FIGS. 6A–6D illustrate the change in assignment of servers to various server pools 603–605 over time due to the server assignor 102, according to an embodiment of the invention.

FIG. 7 is a diagram showing a table 700 that includes a dynamic preference value column 701, according to an alternative embodiment of the invention.

FIG. 10 is a table 1000 illustrating server preferences and thresholds for work types performed in another work processing facility coupled with a composite preference value, according to an embodiment of the invention.

FIG. 11 illustrates a distributed server assignment system 1101, according to an embodiment of the invention.

DETAILED DESCRIPTION OF THE INVENTION

Figure 1:
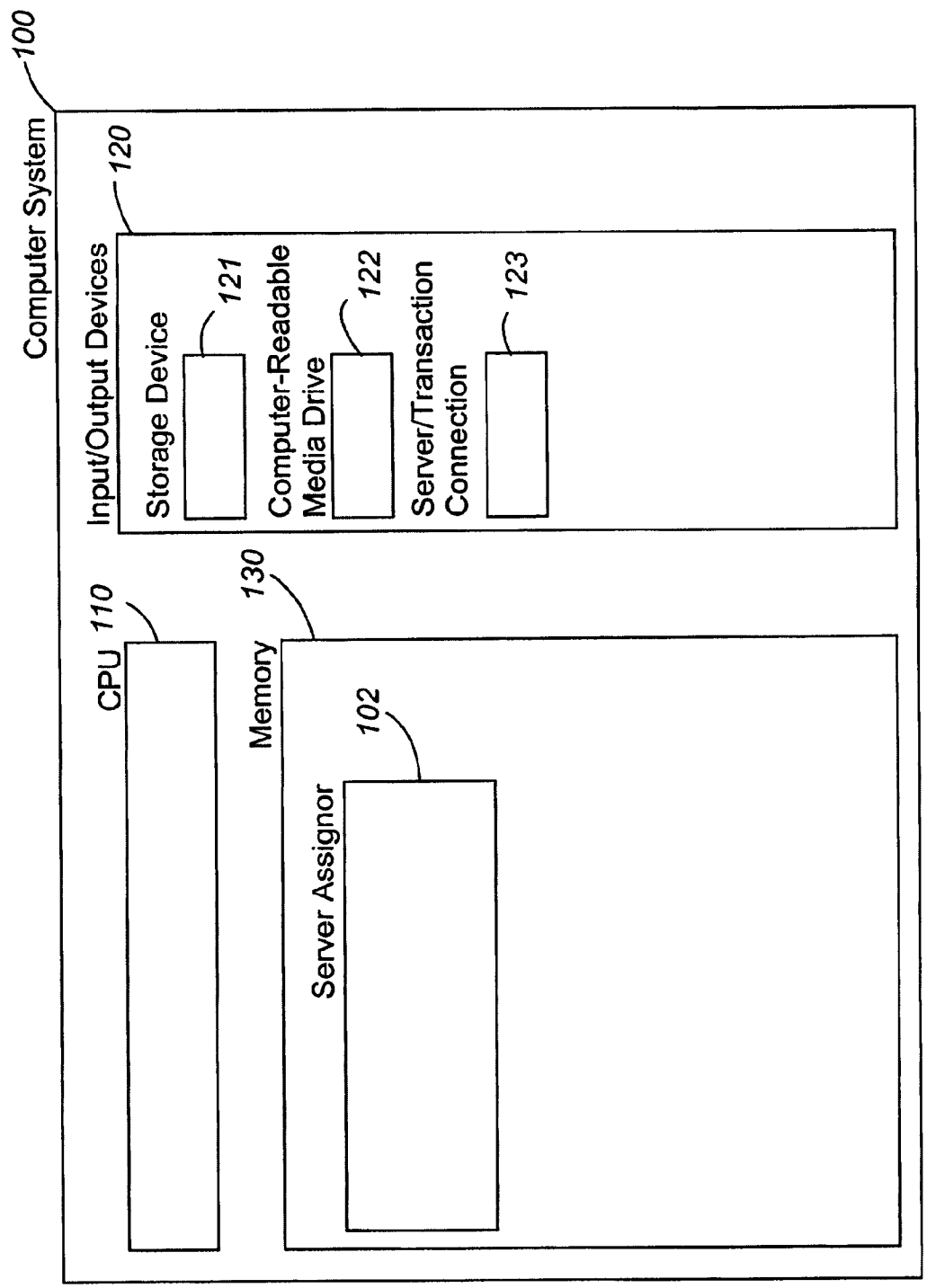
FIG. 1 is a high-level block diagram of a sample general-purpose computer system 100 upon which a server assignor 102 may execute, according to an embodiment of the invention.

The present invention provides a facility for adjusting a pool of servers available for particular work types based on unmet service needs in a work processing facility in order to maximize the achievement of service goals. Servers may include service agents, both human and robotic. A server assignor and a corresponding server assignment method may each be employed in a work distributor to conditionally adjust the assignment of servers to server pools. A server pool represents a set of servers, each of which has a preference sufficient to render him available to perform a certain work type. A server can belong to none, one, or more server pools. An example of a common work distributor where work is incoming telephone calls is an automatic call distributor ("ACD").

Each server has a preference value and a threshold value for different work types. The magnitude of a preference value represents an affinity for the associated type of work. The server's threshold value represents a reluctance to perform work of that work type. Normally, the server does not receive work for a work type for which the preference value is less than the threshold value. However, when the server assignor determines that the composite preference value for a work type is no longer less than the server's corresponding threshold value for that work type, then the server assignor indicates that the server may be included in the server pool for that work type.

The server may have just one threshold value for all work types, according to one embodiment. Additionally, the threshold values and the server preference values can be dynamically based upon other automated control systems and systems that integrate manual inputs from supervisory operators with dynamic service and utilization characteristics.

The server assignor may compute the composite preference value from a number of user-selectable inputs using a number of user-selectable functions. The composite preference value may include a dynamic preference value for a work type that has been calculated from a variety of inputs, such as service levels, queue conditions, alarm conditions, a desired service level, answer delays, call abandonment rates, and operator interventions. In one embodiment, the inputs of the composite preference value function comprise the server's preference for the work and a dynamic preference value that is an attribute of the work type. The dynamic preference value represents the work processing facility's preference for having servers perform a particular type of work in comparison to other types of work, typically without reference to server preferences.

The server assignor could utilize any of myriad functions for a composite preference value that receive as inputs the dynamic preference value and the server's preference value for the work type. These functions can also receive as inputs other information such as work arrival rates, goal attainment, and other relevant information required to support the server assignor. A simple composite preference value function comprises summing the server's preference value for the work type and the dynamic preference value. Work types for which the server is basically unqualified (without a preference value) normally (at least in a preferred embodiment) receive no composite preference value regardless of the dynamic preference value.

The confluence of the consideration of many types of attributes can determine the work types depending on how the enterprise's work operation wants to organize. The work type could be determined by a combination of the task required, the product, the communications medium, geographic, governmental jurisdiction, demographic, language, skill, type of service, customer profile, stage in sales process, and regulatory classes. Consider the following examples. A work distribution operation may want to differentiate expediency by type of media such as inbound telephone calls, electronic mail, World Wide Web hits, United States Postal Service mail, and other mail. It may want to provide a different service profile based upon the type of customer relationship such as prospective customer, new customer, old customer, lost customer, and undesirable customer. It could require different handling based upon regulatory constraints, such as particular sales tasks require a server that is licensed in the state where the client resides, while the same task can be handled by any server for customers in other states. An inquiry to a cellular telephone company may be classified geographically in order to satisfy different processing constraints due to regulation by certain public utilities commissions. Prospects and customers could be classified according to various market segments to facilitate a market segmentation strategy. Demographic factors such as age, income, education, occupation, and household size could be used to identify customers in various target markets for various product lines. The work distribution could require classification by the type of task, such as address change, billing inquiry, loan request, solicited sale, unsolicited sale, sale across product lines, technical support, complaint, problem identification, and problem resolution. Typically, combinations of such work and customer attributes effect a very complicated set of work types. The present invention supports such complications without the inefficiencies of unduly fragmenting the server population into small static pools.

The user-selectable composite value function should be monotonically increasing with respect to both the dynamic preference value and the server's preference value, according to a preferred embodiment of the invention. That is, if the server's preference value increases or decreases then the composite preference value increases or decreases, respectively, with all other things being equal. Likewise, if the dynamic preference value increases or decreases then the composite preference value increases or decreases, respectively, with all other things being equal. Of course, the skilled artisan will recognize that the composite preference value function could utilize additional inputs or even fewer inputs, depending on the needs of the server assignor and the work processing system, and should also recognize a variety of suitable methods for producing a composite preference value function from these inputs. Some embodiments may utilize overriding control laws that dynamically manipulate the selection of the composite value function so as to achieve other desired operating characteristics. Examples of other desired operating characteristics include equal allocation of service level performance in excess of the associated goals, equal utilization of servers, damping of fluctuations in service level attainment, damping of fluctuations in server idleness, and mode-specific behavior. The overriding control laws may constitute another layer of control on top of the method of the user-selectable composite preference value in these embodiments of the invention.

An exemplary method and system for computing a dynamic component in a composite preference value is disclosed in U.S. patent application Ser. No. 09/248,047, "Hierarchical Service Level Remediation for Competing Classes Based Upon Achievement of Service Level Goals," filed on Feb. 10, 1999, assigned to the Mosaix Corporation, and which is incorporated herein by reference.

The server assignor and its corresponding server assignment method apply a dynamic expediency demand of work to effect an expansion in the server pool for work types having unmet or marginally achieved goals. Likewise, the server assignor can effect a contraction of a server pool for work types deemed to have a disproportionate supply of available servers. The server assignor and server assignment method allow a servicing operation to utilize servers commensurate with the effect of operational rules for expediting work and distributing work fairly according to operating rules. This can help eliminate manual intervention to reallocate servers based on realized results. As previously discussed, manual dispatching is often too late and leads to more problems when the reallocated servers are not returned to their preferred work soon enough to meet goals. The server assignor and server assignment method dynamically enable the automatic shared utilization of backup servers for a work type without undue constraints upon the work processing facility and the server organization. The server assignor and server assignment method can improve customer service by meeting service goals and reduce the burden on supervision by reducing the need for server reallocations effected by manual intervention.

The server assignor is particularly helpful in mitigating service demands associated with work types that are subject to service level goals. As previously discussed, the service level goals may relate to an enterprise's operating rules. These work types have classes of service demands that are herein called service classes. A service class is merely the part of the service level goal that defines the set of transactions that apply to the goal. The desired service level and the criteria for classifying the service into good or bad are not part of the service class. For example, assume an operation has the goal of processing 80% of the e-mail inquiries from premium prospects within 6 hours. The "e-mail inquiries from premium prospects" is the service class that pertains to the goal. Whether or not a server processes an inquiry within 6 hours does not affect membership in the service class, and the 80% goal value is not part of the definition of the service class.

The relationship between work types and service classes is frequently complicated and is certainly not trivial. Service classes are not necessarily mutually exclusive, nor are they necessarily collectively inclusive. Service classes may be defined by attributes not related to server skills or they may be defined by the same attributes that define server skills. Additionally, more than one goal may pertain to a service class. With regard to server preferences, the work type is frequently a more pertinent characteristic than service class, according to an embodiment of the invention.

The dynamic preference values of the work types constitute a vector that functions as a control input to a server assignor in a work distributor. The dynamic preference values may sway decisions on server assignments to work. The work distributor biases server distribution to work types in accordance with the magnitude of their preference values. Without the operation of a machine that utilizes dynamic preference values associated with work types, the work distributor or ACD can still function, but with a diminished ability for expanding or contracting a server pool automatically. With a machine using the server assignor, the work distributor enjoys a dynamic server pool that enables the attainment of the goals associated with various service classes.

For example, in a situation in which a work distributor would normally have exhausted all servers marked as assignable to transactions of a first service class, in the presence of the server assignor, the work distributor may have additional servers marked as assignable once the service organization's goals associated with the first service class become sufficiently jeopardized, relative to other goals in terms of priority. According to an embodiment of the invention, the server assignor explicitly expands the pool of available servers, while the control of distributing work items to servers remains with the work distributor. According to another embodiment of the invention, the server assignor implicitly expands the pool of available servers in the process of selecting work items for each server. The dynamic preference values only affect work distribution in a marginal sense. For example, a high dynamic preference value for a work type will still not place a server in the pool for a work type for which he is totally unqualified. When no goals are in jeopardy, the server assignor may assign a dynamic preference value of zero for all service classes. In this case, the work distributor matches servers without any compensation for dynamic conditions.

While expansion of the server pool for work types having jeopardized goals may be a typical mode for the server assignor and its server assignment method, there may also be a need to limit resources from exceeding a service level goal. In the situation where all goals are being met, and some service levels are exceeding their goals much more than other goals, then the operating rules may reallocate the servers in order to more evenly distribute the superior service, according to an embodiment of the invention. For example, the dynamic preference may become negative, rather than positive, causing the composite preference to be lower than a server's threshold. When the composite preference falls below the threshold, then the server will temporarily be removed from the server pool for this work type until such a time that the service level goal becomes unmet. Thus, in the case where all service goals are being met, the system can balance between work by expanding resources and contracting resources for any one work type to provide greater consistency across work types.

FIG. 1 is a high-level block diagram of a sample general-purpose computer system 100 upon which a server assignor 102 may execute, according to an embodiment of the invention. The computer system 100 may be contained within a work processing facility, according to an embodiment of the invention. In another embodiment of the invention, the work processing facility may itself be contained within the computer system 100. The computer system 100 contains a central processing unit (CPU) 110, input/output devices 120, and a computer memory (memory) 130. Among the input/output devices is a storage device 121, such as a hard disk drive, and a computer-readable media drive 122, which can be used to install software products, including server assignor 102, which are provided on a computer-readable medium, such as a CD-ROM. The input/output devices 120 further include a connection 123 to servers and transaction sources from which transactions are received. For example, the connection 123 may be used to connect the computer system to one or more computer telephony interfaces, World Wide Web servers, or World Wide Web browsers. This connection is usable by the server assignor 102 to examine servers, make servers available for applications and transactions, and monitor the processing of transactions by servers. The memory 130 preferably contains the server assignor 102.

While the server assignor 102 is preferably implemented on a computer system configured as described above, those skilled in the art will recognize that it may also be implemented on computer systems having different configurations. For example, the server assignor 102 may be implemented on a computer system having different components than described above. The server assignor 102 may also be implemented on special-purpose computing systems, such as those in a call center. The server assignor 102 may further be implemented without software in special-purpose hardware, using, for example, application-specific integrated circuits ("ASICs"). An automatic call distributor ("ACD") in a call center or a work flow automation system may also include the server assignor 102 as part of its functionality.

In order to more fully describe the details of the server assignor 102, its operation in conjunction with a specific example is discussed hereafter. This example is designed to provide a convenient basis for discussing the operation of the server assignor 102, and therefore is not necessarily representative in all senses of a typical application of the server assignor 102. Indeed, those skilled in the art will recognize that the server assignor 102 may be applied to scenarios that are both more extensive and diverse than the scenario portrayed in the example.

FIG. 2 is a server preference table 200 illustrating the preferences of various servers for the various work types 202 that represent types of work performed in the work processing facility, according to an embodiment of the invention. Each server in the system has a server ID 201. Each server may theoretically perform work associated with each possible work type 202 identified by the service organization.

Each server has a preference value 203 for performing work of a particular work type 202. The magnitude of a preference value 203 represents an affinity for the associated work type 202. The magnitude of the preference value 203 may also represent a measure of a server's skills with regard to the associated work type 202. Each server has a threshold value 204 that represents the server's reluctance for performing tasks associated with a particular work type 202. The threshold value 204 may also represent a measure of the server's disabilities with regard to performing the tasks associated with a particular work type 202. Accordingly, the server preference table 200 has entries 205–209 corresponding to each server ID 201 and each work type 202. For example, the entry 205 represents the preferences of the server with server ID 100 with regard to the work type "calls from prospects." For this particular work type, the server ID 100 has a preference value for the service class of "8" and a threshold value for the service class of "9." Normally, the server does not do work for which the preference value is less than the threshold value. Accordingly, the server ID 100 would not normally perform tasks associated with "calls from prospects." On the other hand, as indicated in the entry 205, the server ID 100 would typically perform tasks associated with "claims calls" 206 since the preference value 203 for this work type is "4" while the threshold value 204 is "3."

Work types for which the server is basically unqualified have no preference value or a preference value of "0." For example, the server ID 101 is not qualified to perform work associated with "calls from preferred customers" as shown in entry 209. Accordingly, the work distributor will not assign the server ID 101 to perform work associated with calls from preferred customers.

FIG. 3 is a diagram showing a table 300 illustrating server preferences and thresholds for work types performed in the work processing facility coupled with a composite preference value, according to an embodiment of the invention. The composite preference value accounts for not only an individual's preferences for a particular work type but also the work processing facility's preferences with regard to the work type. Comparing FIGS. 2 and 3, it can be seen that the contents of columns 301–304 in the table 300 correspond respectively to the contents of columns 201–204 in the table 200. The table 300 also includes an additional column: a composite preference value column 305 that also represents the work processing system's overall preference for the respective server to perform work that contains the work type 302. For example, the composite preference value for server ID 100's "calls from prospects" is "10" while the Server ID 100's composite preference value for "claims calls" is "8."

The server assignor 102 may utilize a variety of functions to compute the composite preference value that may include a dynamic preference for the work type. At least one exemplary procedure for generating a dynamic preference value for a work type is disclosed in U.S. patent application Ser. No. 09/149,877, "Dynamically Assigning Priorities for the Allocation of Server Resources to Competing Classes of Work Based Upon Achievement of Service Level Goals," filed on Sep. 8, 1998, assigned to the Mosaix Corporation, and which is incorporated herein by reference.

Figure 4:
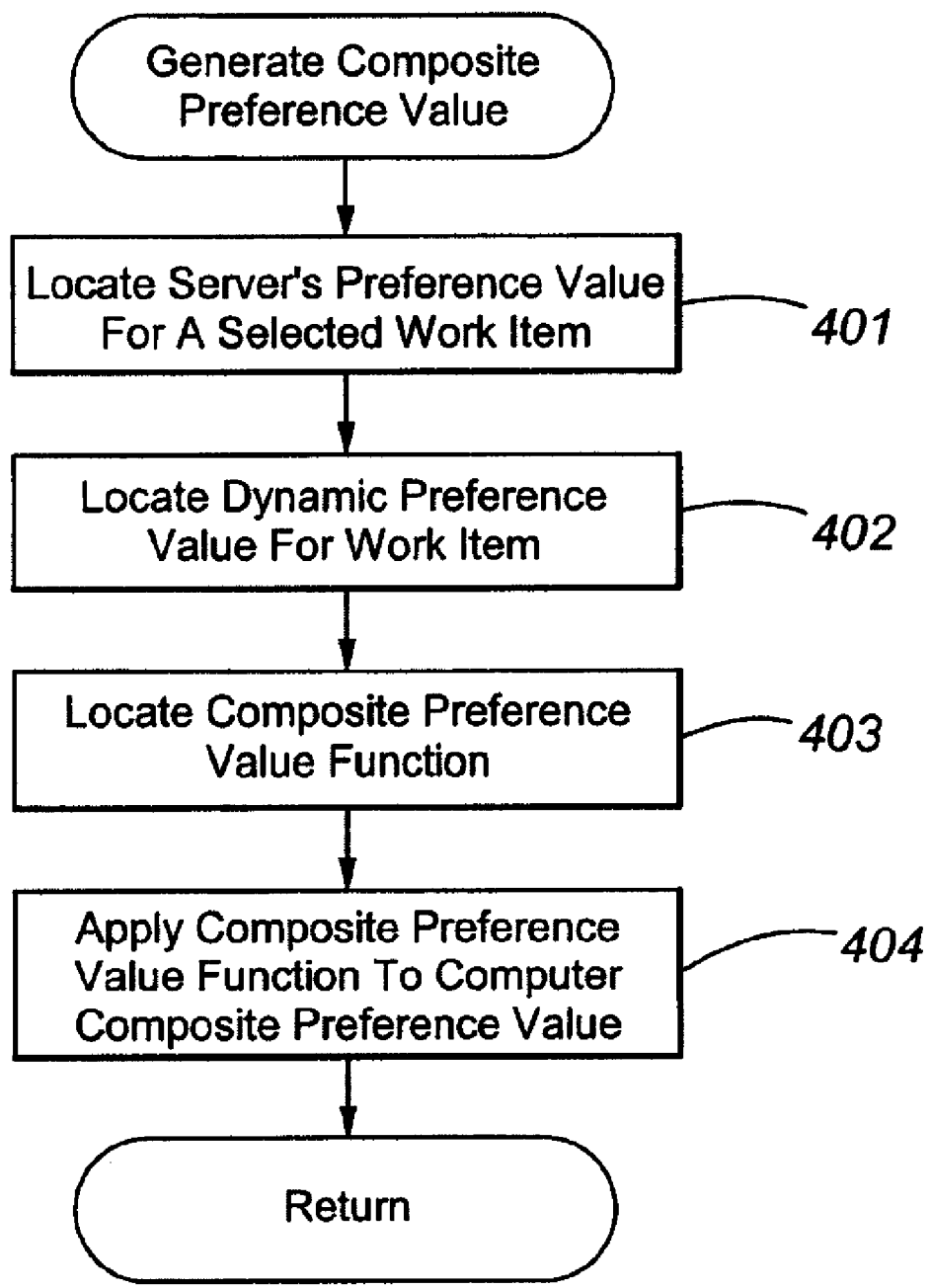
FIG. 4 is a flowchart illustrating the generation of composite preference values using the server assignor 102 or its corresponding method, according to an embodiment of the invention.

FIG. 4 is a flowchart illustrating the generation of composite preference values using the server assignor 102 or its corresponding method, according to an embodiment of the invention.

The server assignor 102 locates a server's preference value for a selected work item's work type (step 401). In some embodiments of the invention, the server assignor 102 determines the work type for the selected work item. In other embodiments of the invention, the determination of the work type for the selected work item may be performed prior to the generation of composite preference values, with the server assignor 102 simply locating the determined work type for the work item. The server assignor 102 may examine a server preference table, such as the server preference table 200 shown in FIG. 2. Assume that the available server is the server ID 100 shown in the server preference table 200 of FIG. 2 and that the selected work type is "calls from prospects." Accordingly, the server assignor 102 would identify the server ID 100's preference for "calls from prospects" as having a preference value of "8."

The server assignor 102 locates the dynamic preference value for the work item (step 402). As previously mentioned, the dynamic preference value could be an attribute of the work type. A number of functions may be utilized in determining the dynamic preference value for the work type. For example, the dynamic preference value may be based upon attained service levels, queue conditions, a desired service level, alarm conditions, answer delays, call abandonment rates, or operator interventions. Assume that the dynamic preference value is based upon a combination of attainment/non-attainment of desired service level and a priority for the work type. Accordingly, higher priority work types whose desired service levels are not presently being attained will have higher dynamic preference values than other work types, e.g., work types whose service levels are being attained or work types of lower priority. Assume further that the dynamic preference value for "calls from prospects" is "4."

The server assignor 102 locates the composite preference value function presently selected within the work processing facility (step 403). As previously discussed, the server assignor 102 allows for user selection of various parameters, such as the composite preference value function. At various times, facility management, for example, may determine that one composite preference value function is preferable to another.

An exemplary composite preference value function might comprise adding the server's preference value for a work item's work type (step 401) with the dynamic preference value for the work item (step 402). Another exemplary composite preference value function might comprise multiplying the server's preference value for a work item's work type (step 401) with the dynamic preference value for the work item (step 402). Yet another exemplary composite preference value function might comprise adding the server's preference value for a work item's work type (step 401) weighted according to another parameter with the dynamic preference value for the work item (step 402) also weighted according to another parameter. A variety of scaling factors may also be used in still other exemplary embodiments of the composite preference value function.

Regardless of the composite value function selected, the server assignor 102 utilizes the composite preference value function to compute the composite preference value (step 404). Assume that the presently selected composite preference value function calls for adding the server's preference value with the dynamic preference value. Adding the server ID 100's preference value for "calls from prospects" ("8") with the dynamic preference value for "calls from prospects" ("4") yields "12."

As previously discussed, the work processing facility does not normally provide work to a server when the server's preference value is less than the server threshold value for the same work type. The server ID 100's preference value for "calls from prospects" ("8") is less than the server ID 100's corresponding threshold value ("9"), as shown in FIG. 2. The work processing facility would not normally consider the server ID 100 to be in the pool of servers that may be assigned work associated with "calls from prospects." However, as shown above, the server ID 100's composite preference value is 12, which exceeds the server ID 100's threshold value of 9. In other words, the needs of the work processing facility for the server ID 100 to process "calls from prospects" now outweighs the server ID 100's reluctance to perform such tasks. Accordingly, the work processing facility may now consider the server ID 100 to be within the pool of servers who may receive calls from prospects. Of course, when a re-calculation of the composite preference value for the "calls from prospects" work type results in a composite preference value lower than the server ID 100's threshold value, then the server ID 100 may be removed from the "calls from prospects" server pool. In addition, the composite preference value (according to a preferred embodiment) will never result in the assignment of an unqualified server to a server pool. Work types for which a server is basically unqualified (having a preference value of "0") may receive a composite preference value of "0."

The composite preference value function may be any of myriad functions of the service class preference value and the server's preference value for the work type, according to an embodiment of the invention. The composite preference function may be dynamically selected contingent upon various operating modes and various other operating conditions independent of normal service goals. Such modes might be related to secondary goals involving efficiency of the server population, fairness considerations, job enrichment desires, or particular exceptional conditions. A simple example of an operating condition is time of day while another is a day of the week where the business is operating under different business rules.

Figure 5A:
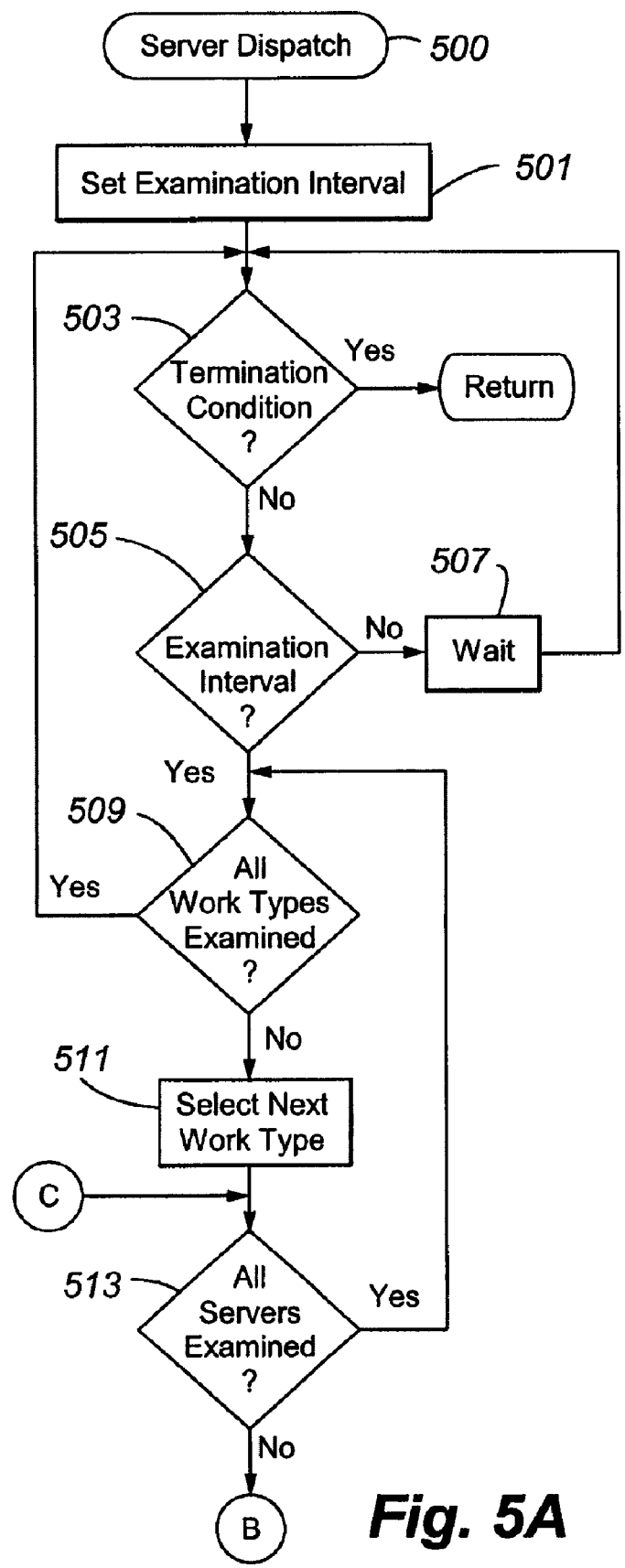
FIGS. 5A and 5B are a flowchart illustrating the server dispatch procedure, according to an embodiment of the invention.
Figure 5B:
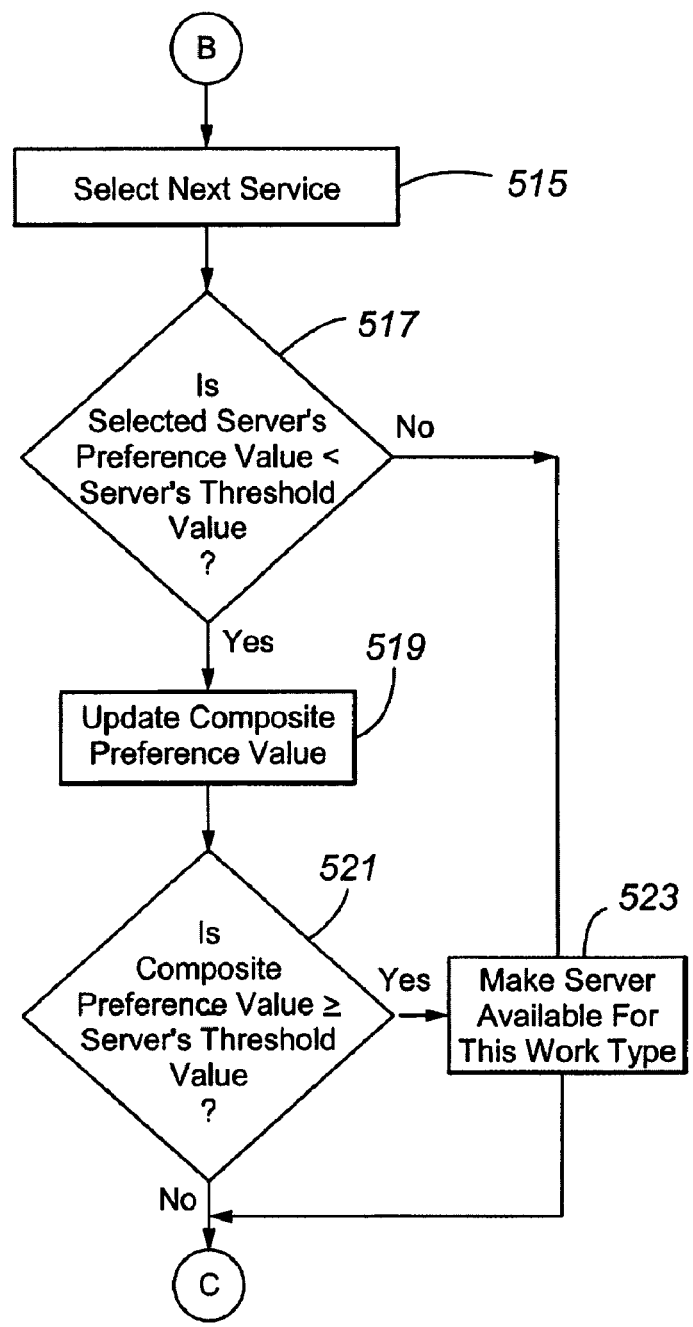

FIGS. 5A and 5B are a flowchart illustrating the server dispatch procedure, according to an embodiment of the invention. The server assignor 102 sets an examination interval (step 501). The examination interval may comprise any number of time periods or conditions. In at least one embodiment, the examination interval may be set by other functionality within the work processing facility.

The server assignor 102 determines whether a termination condition has arisen (step 503). A termination condition may arise due to a number of factors, including the shutdown of the work processing facility. If a termination condition has arisen (step 503), then the server assignor 102 terminates its operations. The server assignor 102 otherwise continues operations at some regular interval until a termination condition arises.

If a termination condition has not arisen (step 503), then the server assignor 102 determines whether an examination interval has concluded (step 505). If an examination interval has not concluded (step 505), then the server assignor 102 waits (step 507) before re-determining whether a termination condition has arisen (step 503) and/or the examination interval has concluded (step 505). The length of the examination interval may be user selectable, and the examination interval may be so frequent as to be essentially continuous, according to at least one embodiment of the invention.

If an examination interval has concluded (step 505), then the server assignor 102 determines whether all work types have been examined (step 509). If all work types have been examined (step 509), then the server assignor 102 returns to determining whether a termination condition has arisen (step 503) before otherwise proceeding to determine if another examination interval has concluded (step 505).

Of course, a skilled artisan will recognize that the server assignor 102 does not typically analyze all work types and all servers all of the time. In practice, an "examination" may begin when a server becomes available. The examination would concern that server only and with regard only to the work types represented by work items already queued. In addition, an examination may also begin when a work item arrives in the work processing facility. The examination interval would concern the newly arrived work item and with regard to servers already awaiting work. An increase in a preference value or a decrease in a threshold value could also trigger an examination. A server need not generally be included in a new server pool when the server is presently busy with another non-interruptible work item. Of course, little need arises to determine server membership in a server pool for work types where no work is presently queued. As a skilled artisan will recognize, these conditions will substantially reduce the processing demands associated with the server assignor 102, according to an embodiment of the invention.

If all work types have not been examined (step 509), then the server assignor 102 selects the next work type to be examined (step 511). The server assignor 102 determines whether all servers have been examined (step 513). If the server assignor 102 has examined all servers (step 513), then the server assignor 102 returns to determining whether all work types have been examined (step 509).

If all servers have not been examined (step 513), then the server assignor 102 selects a next server (step 515). The server assignor 102 determines whether the selected server's preference value is less than the server's threshold value (step 517). If the selected server's preference value is not less than the server's threshold value (step 517), then the server assignor 102 makes the server available for the selected work type (step 523). Making the server available for the selected work type may entail modifying a server pool utilized by the work assignment facility in the work processing system. On some occasions, the server may have previously been assigned to the server pool for the work type, and no additional processing will be required. Of course, as discussed above, not all servers and all work items necessarily need to be examined all the time.

If the selected server's preference value is less than the server's threshold value for the selected work type (step 517), then the server assignor 102 updates the composite preference value associated with the work type and server (step 519). FIG. 4 provides an exemplary procedure for updating a composite preference value. Updating the composite preference value associated with the work type and server may include determining which composite preference value function the server assignor 102 should utilize. As previously discussed, the user may select the composite preference value function used by the server assignor 102, according to an embodiment of the invention.

The server assignor 102 then applies the selected composite preference value function to determine whether the composite preference value is greater than or equal to the server's threshold value (step 521). If the composite preference value is greater than or equal to the server's threshold value, than the server assignor 102 makes the server available for this work type (step 523). The server assignor 102 may simply indicate to the work processing facility that the server should be included in the server pool for the work type, without actually undertaking any of the steps required to accomplish the assignment of the server to the server pool for the work type. If the composite preference value is not greater than or equal to the server's threshold value, then the server assignor 102 does not select the server for this work type and returns to examining other servers (step 513).

The flowchart shown in FIGS. 5A and 5B for the server dispatch procedure is equally applicable for both centralized and distributed server dispatch procedures. Accordingly, the server dispatch procedure may exist in a centralized embodiment as well as a distributed embodiment. For example, the evaluation of the dynamic preference can be determined by one process running on one or more processors while the composite preferences could be determined by processors each of which is dedicated to a server, where these dedicated processors obtain the set of dynamic preferences through some means of communication. The actual processing of the server dispatch process may be realized in any configuration that is practical for a particular implementation.

FIGS. 6A–6D illustrate the change in assignment of servers to various server pools 603–605 over time due to the server assignor 102, according to an embodiment of the invention. For purposes of illustration, one can assume that a work type 601 associated with the server pool 603 has a higher average composite preference value than the work type associated with the server pool 604 which in turn has a higher average composite preference value than the work type associated with the server pool 605.

Because of unmet needs in the work processing facility, the server assignor 102 allows more servers to be made available for work types whose goals are not being met. Changes in the assignment of servers alters a number of available servers 602 in the server pools from the chart shown in FIG. 6A to the chart shown in FIG. 6B. In FIG. 6A, the work type "calls from prospects" has a server pool 603 of 42 available servers. Because of unachieved goals associated with "calls from prospects," the server assignor 102 increasingly updates the number of servers in the server pool 603 to 48 servers, as shown in FIG. 6B. Of course, a server may be assigned to more than one server pool.

Similarly, the number of servers in the "claims calls" server pool 604 has decreased during the time interval represented by FIGS. 6A and 6B. The decrease in the number of servers in the "claims calls" server pool 604 could be due to changing server preference values or to changes in the dynamic preference value. The server pool 605 for the "calls from preferred customers" work type remains constant during the time interval represented by FIGS. 6A and 6B. Of course, the servers in the "calls from preferred customers" server pool 605 shown in FIG. 6B need not necessarily be the same servers shown for the "calls from preferred customers" server pool 605 of FIG. 6A.

Because of unmet needs in the work processing facility, the server assignor 102 continues to utilize a dynamic preference value that results in making more servers available for the "calls from prospects" server pool 603, as shown by comparing FIG. 6B with FIG. 6C. Similarly, the "claims calls" server pool 604 and the "calls from preferred customers" server pool 605 collectively decrease during the time interval represented by FIGS. 6B and 6C.

The server assignor 102 may be designed to retain a maximum and/or minimum number of servers for a server pool, according to an embodiment of the invention. For example, the "calls from preferred customers" server pool 605 may have a minimum server number of "10." Accordingly, the server assignor 102 refrains from re-assigning servers from the "calls from preferred customers" server pool 605 to the server pools 603–604 once the server pool 605 has reached its minimum number of servers, which may also be known as reserved servers.

The server assignor 102 may contract a server pool for work types deemed to have a disproportionate supply of available servers. While expansion of the server pool for work types having jeopardized goals is the typical mode for the server assignor 102 and its server assignment method, the server assignor 102 may also need to limit server resources from exceeding a service level goal, according to an embodiment of the invention. In the situation where all goals are being met, and some service levels are exceeding their goals much more than other service levels are exceeding their respective goals, then the server assignor's operating rules may reallocate the servers in order to more evenly distribute the server resources.

For example, assume that the "calls from prospects" server pool 603 shown in FIG. 6C contains more servers than are necessary to achieve the associated service goals. Since the goals associated with the "calls from prospects" server pool 603 are now being achieved beyond a desired level, then the number of servers may be decreased so that other service goals may also be achieved. Accordingly, the number of servers in the "calls from prospects" server pool 603 decreases from FIG. 6C to FIG. 6D. The number of servers assigned to the server pools 604–605 correspondingly increases from FIG. 6C to FIG. 6D.

To reduce the number of servers in the server pool 603, the server assignor 102 may make the dynamic preference value for the server pool 603 become negative, rather than positive, causing the composite preference value to be lower than one or more server's threshold value. When the composite preference value falls below a server's threshold value (where the server's preference value is also lower than the threshold value), then the server will temporarily be removed from the server pool for the work type until the service level goal becomes unmet. Thus, in the case where all service goals are being met, the server assignor 102 may balance between work types by expanding resources (e.g., servers) and contracting resources (e.g., servers) for any one work type to provide greater consistency across some set of work types. It should be obvious to one skilled in the art that the dynamic preference value may remain at zero, be increasing, or not be considered while the function(s) driving the composite preference value cause(s) the composite preference value to fall below a server's threshold value.

FIG. 7 is a diagram showing a table 700 that includes a dynamic preference value column 701 as well as server preferences and thresholds for work types performed in the work processing facility and a composite preference value, according to an alternative embodiment of the invention. Comparing the table 300 of FIG. 3 with the table 700, it can be seen that the columns 301–305 of table 300 correspond respectively to the columns 301–305 of the table 700. The table 700 also includes the dynamic preference value column 701 that represents the service organization's current preference value for performance of various work types.

As previously discussed, a number of methods may be used to compute the composite preference value recorded in the composite preference value column 305. In the table 700, the composite preference values in the composite preference value column 305 have been determined by adding together the server preference for the work type column 303 with the dynamic preference value for the work type 701. For example, the composite preference value for server ID 100's "calls from prospects" is "10" which has been computed by adding the Server ID 100's preference value of "8" for this work type with the dynamic preference value for this work type of "2." In all other respects, the invention operates in the manner described above.

The threshold value for a work type has previously been described as bearing a relationship to a particular server. For example, as shown in FIG. 2, the Server ID 100's threshold value for the "claims calls" work type is "3" while the Server ID 101's threshold value for the "claims calls" work type is "7." Similarly, the Server ID 100's threshold value for the "claims calls" work type differs from the Server ID 100's threshold value for the "calls from prospects" work type.

Figure 8:
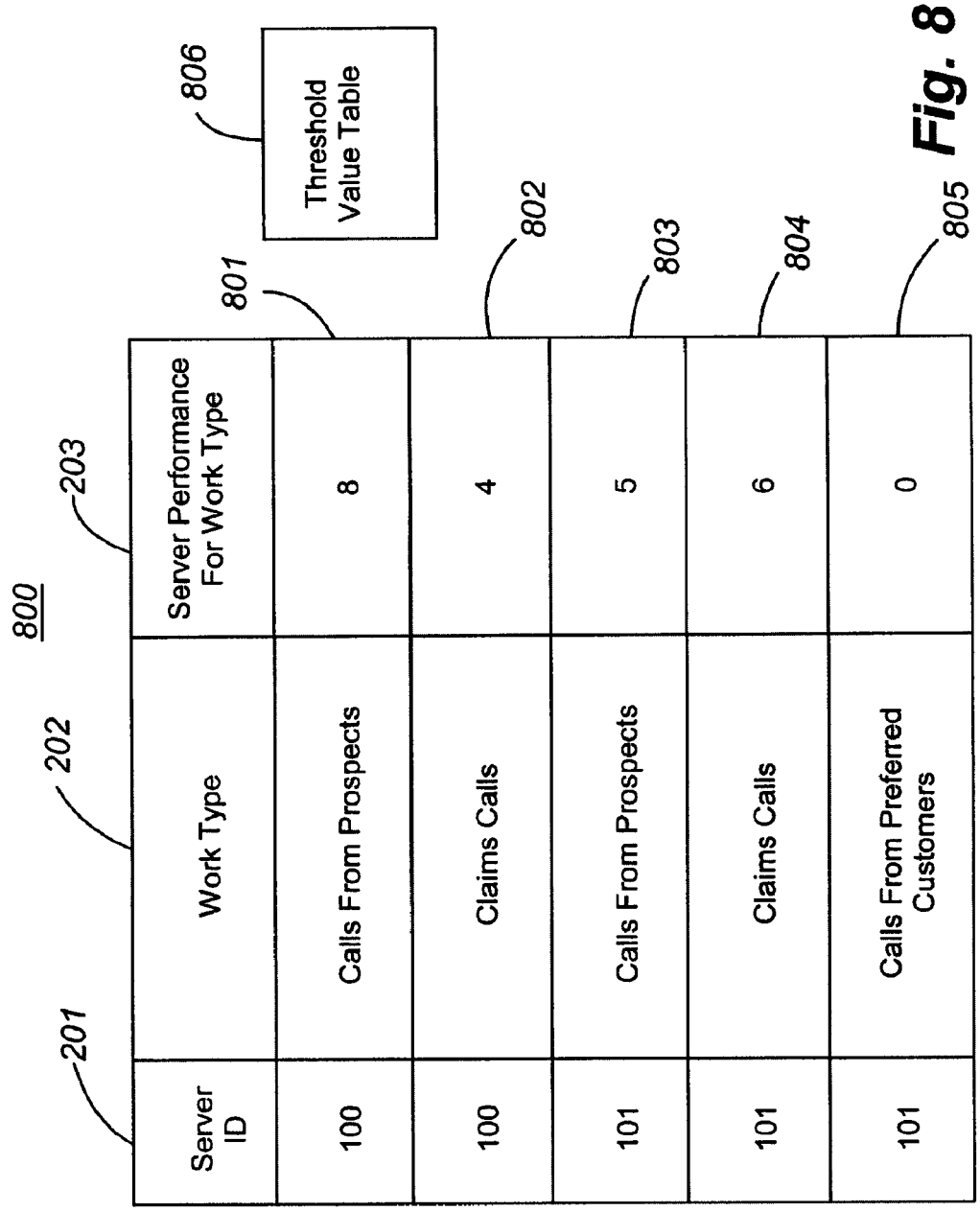
FIG. 8 is a server preference table 800 illustrating the preferences of various servers for the various work types 202 that represent types of work performed in the work processing facility, according to an embodiment of the invention.

In an alternative embodiment of the invention, the threshold value for a work type may be established without reference to a particular server. FIG. 8 is a server preference table 800 illustrating the preferences of various servers for the various work types 202 that represent types of work performed in the work processing facility, according to an embodiment of the invention. The server preference table 800 resembles the server preference table 200 shown in FIG. 2, except the server preference table 800 does not contain the server threshold for work type column 204 shown in FIG. 2.

The server preference table 800 may be associated with a threshold value table 806 that contains appropriate threshold values for various work types, according to an alternative embodiment of the invention. In this embodiment, the server assignor 102 will reference an appropriate value in the threshold value table 806 in determining whether to assign work to a particular server. For example, the threshold value table 806 may have just one threshold value for all work types, according to one embodiment. The threshold value table 806 may instead have one threshold value for all work types for each server. Alternatively, the threshold values and the server preference values may be dynamically based upon other automated control systems and systems that integrate manual inputs from supervisory operators with dynamic service and utilization characteristics. In addition, the threshold value may be differently determined for each work type. Of course, the server preference table 800 and the threshold value table 806 may be stored in a common memory element and may have inter-related data structures, according to an embodiment of the invention.

Of course, the elements contributing to a work type for the determination of server preference may be totally independent of the attributes that determine the dynamic preference value, according to an embodiment of the invention. For example, as shown in FIG. 8, one can readily see that the work type needed to get the server preferences for the server ID 100 is independent of other attributes, such as a regional attribute describing the location of a caller or the location of the server ID 100. However, the dynamic component of the preference (which is independent of the server) may be determined partly by other attributes, such as a regional attributes. Additionally, the work types shown in FIG. 8, for example, need not necessarily be utilized to any extent in determining the dynamic component of the preference.

Figure 9A:
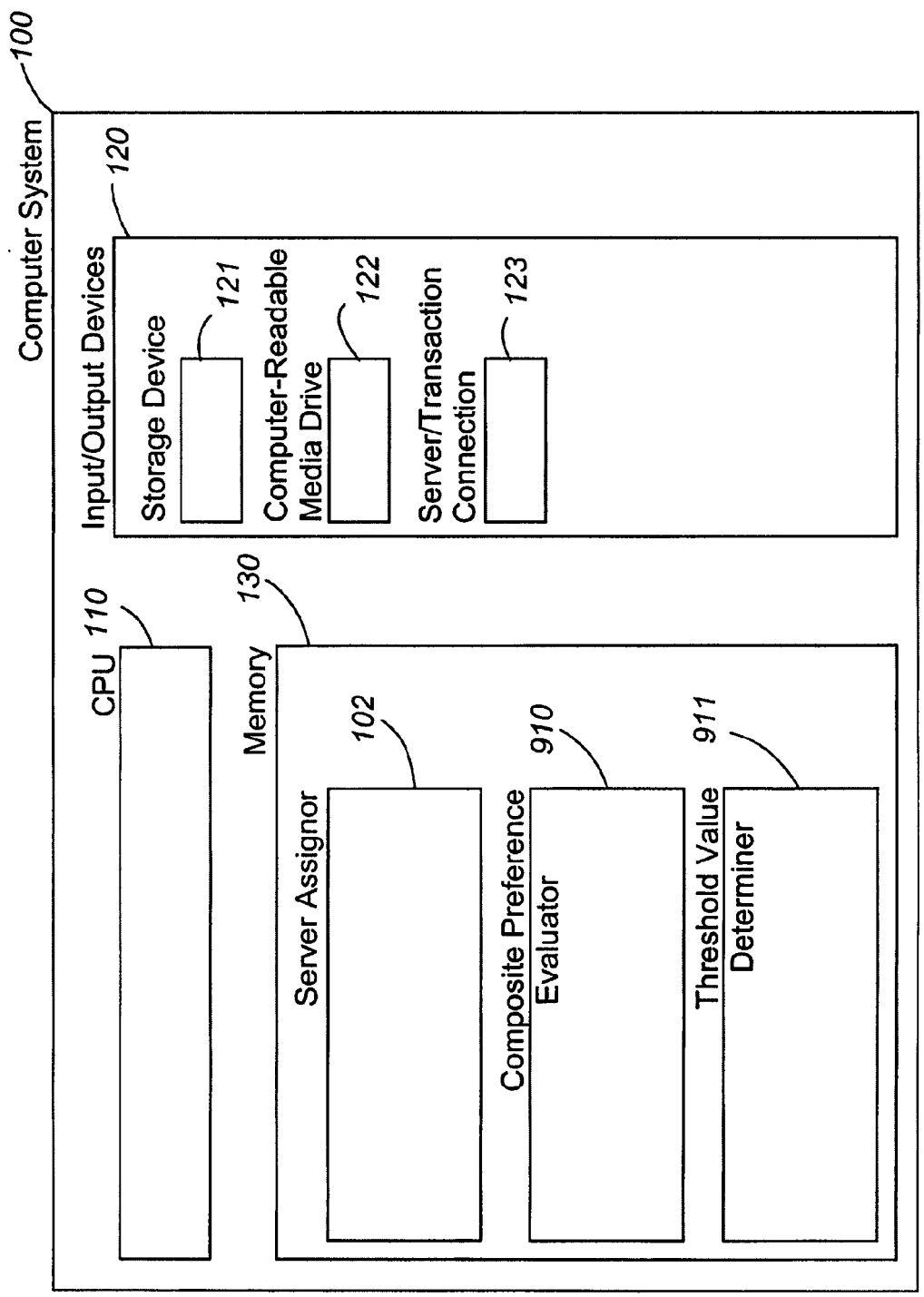
FIG. 9A is a high-level block diagram of another general-purpose computer system 100 that includes a threshold value determiner 911 and a composite preference evaluator 910, according to an alternative embodiment of the invention.

FIG. 9A is a high-level block diagram of another general-purpose computer system 100 that includes a threshold value determiner 911 and a composite preference evaluator 910, according to an alternative embodiment of the invention. The threshold value determiner 911 may compute the threshold values for the threshold value table 806 shown in FIG. 8. The composite preference evaluator 910 may determine whether the presently selected user-selectable composite preference value function is the most appropriate composite preference value function for achieving the enterprise's objectives with regard to the work processing facility, according to an embodiment of the invention. In all other respects, the computer system 100 operates in the manner previously described for the computer system 100 shown in FIG. 1. Of course, the composite preference evaluator 910 and the threshold value determiner may be included in other functionality, such as the server assignor 102.

The composite preference evaluator 910 may utilize overriding control laws that dynamically manipulate the selection of the composite value function so as to achieve other desired operating characteristics, such as equal allocation of service level performance in excess of the associated goals, equal utilization of servers, damping of fluctuations in service level attainment, damping of fluctuations in server idleness, and mode-specific behavior. The composite preference evaluator 910 may be considered to constitute another layer of control on top of the previously described composite preference value function in this embodiment of the invention.

The composite preference evaluator 910 may dynamically select the composite preference function contingent upon various operating modes and various other operating conditions independent of normal service goals. Such modes might be related to secondary goals involving efficiency of the server population, fairness considerations, job enrichment desires, or particular exceptional conditions.

Figure 9B:
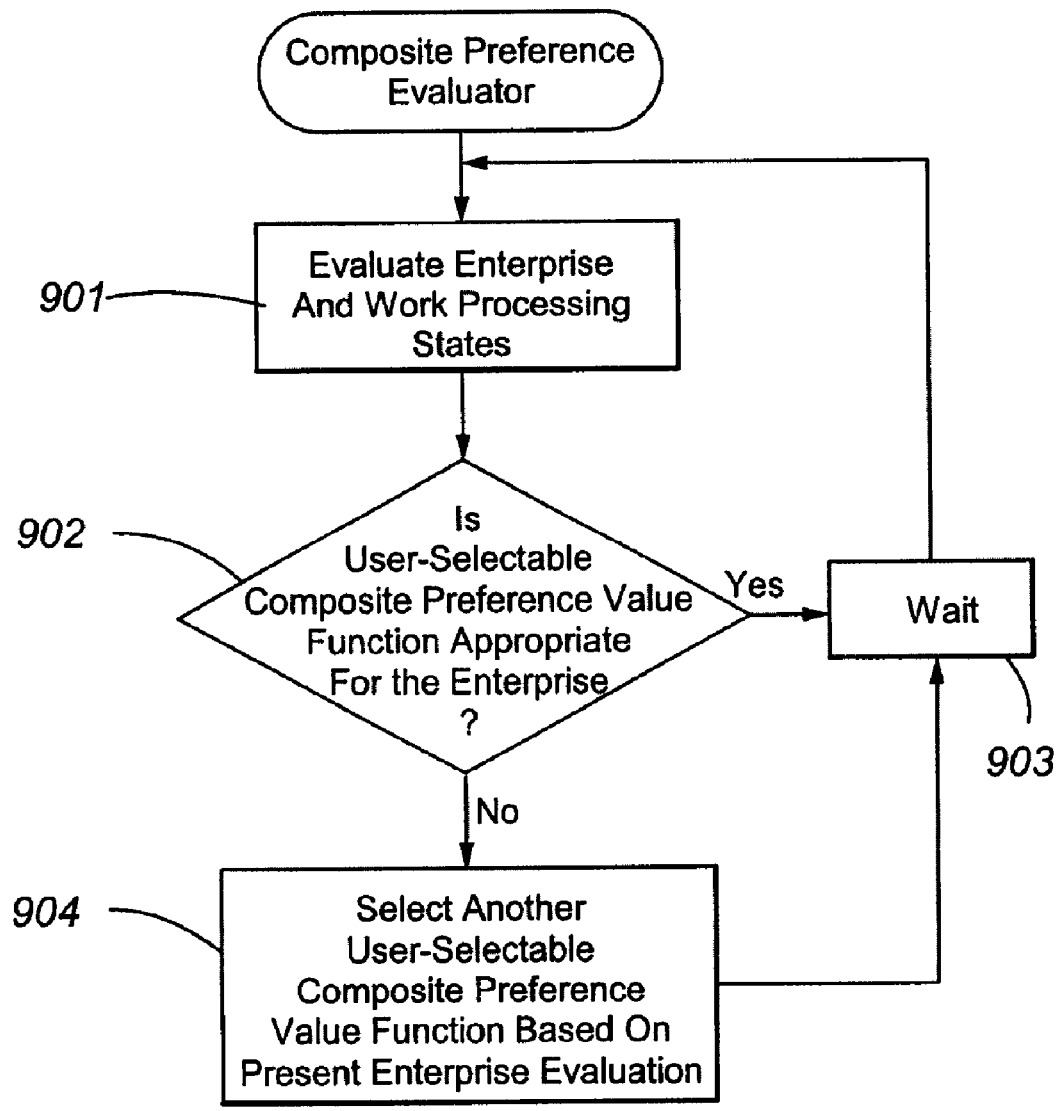
FIG. 9B is a flowchart illustrating some of the operations performed by the composite preference evaluator 910, according to an embodiment of the invention.

FIG. 9B is a flowchart illustrating some of the operations performed by the composite preference evaluator 910, according to an embodiment of the invention.

The composite preference evaluator 910 evaluates the enterprise and its associated work processing states to determine the overall attainment level of the enterprise's objectives for the work processing facility (step 901). The composite preference evaluator 910 then determines whether the presently selected user-selectable composite preference value function is the appropriate composite preference value function in light of the evaluation of the enterprise and its associated work processing states (step 902).

If the composite preference evaluator 910 determines that the presently selected user-selectable composite preference value function is the appropriate composite preference value function in light of the evaluation of the enterprise and its associated work processing states (step 902), then the composite preference evaluator 910 enters a wait state (step 903) before once again performing the enterprise evaluation (step 901).

If the composite preference evaluator 910 determines that the presently selected user-selectable composite preference value function is not the appropriate composite preference value function in light of the evaluation of the enterprise and its associated work processing states (step 902), then the composite preference evaluator 910 selects another user-selectable composite preference value function based on the present enterprise evaluation (step 904). The composite preference evaluator 910 then enters a wait state (step 903) before once again performing the enterprise evaluation (step 901).

The wait state (step 903) could terminate by a number of means and for a variety of reasons. For example, the wait state could be a predetermined period of time. Additionally, it could be triggered contingent upon or synchronous with the utilization of the composite preference value function or other events. As previously discussed, the confluence of many types of attributes can determine the work types, according to an embodiment of the invention. The work type may be determined by multiple considerations, such as a combination of the task required, the product, the communications medium, geographic, governmental jurisdiction, demographic, language, skill, type of service, customer profile, stage in sales process, and regulatory classes, according to embodiments of the invention.

FIG. 10 is a table 1000 illustrating server preferences and thresholds for work types performed in the work processing facility coupled with a composite preference value, according to an embodiment of the invention. The table 1000 generally resembles the table 300 shown in FIG. 3 except that the work types in the work type column 302 may contain more than a single attribute. For example, a row 1001 contains a multiple attributes work type "calls from prospects in the western region." A corresponding row 306 in the table 300 contains the single attribute work type "calls from prospects." Assigning multiple attributes in a work type may increase the complexity of the over-all system and the total number of work type entries. While the table 1000 only lists the attributes for a server ID 100, similar information could be entered for other servers.

Consider the following example using the table 1000: an inquiry to a cellular telephone company may be classified geographically in order to satisfy different processing constraints in addition to classifying the inquiry as a work type for determination of server preference. Work items entering the work processing facility may not only be categorized for a first attribute (e.g., "prospect calls" or "claims calls") but may also be classified according to a second attribute (e.g., a regional description). Work items may also be classified according to various market segments to facilitate a market segmentation strategy. Demographic factors such as age, income, education, occupation, and household size could be used to identify customers in various target markets for various product lines. Typically, combinations of work and customer attributes effect a very complicated set of work types. The present invention supports such complications without the inefficiencies of unduly fragmenting the server population into small static pools.

The table 1000 also represents the need for some work types to have high priorities although the work type may not be performed frequently. For example, the work processing facility may operate under various regulatory constraints, such as the "public utility mandated calls" work type shown in a row 1005. The "public utility mandated calls" work type may comprise calls having very little profitability for the enterprise but calls that must nevertheless receive service at some officially mandated minimum/maximum level. Accordingly, the table 1000 illustrates a high composite preference value in the row 1005, indicating that the "public utility mandated calls" has come close to reaching (or even dropping below), the publicly mandated service level. Once the server assignor 102 has re-attained the required service level for the "public utility mandated calls," then the composite preference value drops from its high value. In addition to regulatory constraints, the table 1000 may contain other important, high-value goals that may be of limited importance to the enterprise otherwise, such as the attainment of service levels mandated by agreements with various telecommunications service workers unions.

As previously discussed, the server dispatch procedure may be both centralized and distributed. FIG. 11 illustrates a distributed server assignment system 1101, according to an embodiment of the invention. The distributed server assignment system 1101 comprises computer systems 100a–100f. The computer systems 100a–100f contain server assignors 102a–102f and otherwise resemble to computer system 100 shown in FIG. 1.

The server assignors 102a–102f may operate in the manner thus described for the server assignor 102. The server assignors 102a–102f may be located within a single work processing facility or spread across multiple work processing facilities that share work items (or pieces of work items) with each other.

When one of the server assignors 102a–102f cannot accomplish its server assignment tasks, then the server assignor communicates to the other server assignors using a network 1100. The server assignors 102a–102f may also communicate status information with each other using the network 1100.

Some of the server assignors 102a–102f may perform the dynamic preference value determination while other server assignors 102a–102f determine the composite preference value function, according to another embodiment of the invention. In this embodiment, there may be no communication between server assignors, and they act independently, except for communications with a specialized server assignor(s) that provides the dynamic preference value determination.

While this invention has been shown and described with references to preferred embodiments, it will be understood by those skilled in the art that various changes or modifications in form and detail may be made without departing from the scope of the invention. For example, the preference values utilized by the server assignor may be used to assign resources of all types. Further, preference values that are not contiguous integers may be assigned. Further, preference levels that are not contiguous integers may be assigned by the work processing facility, as may be non-numeric service levels. For example, the criteria for meeting good or bad service on a particular work type could avoid the use of integer or decimal numbers by using instead a Boolean function of transaction attributes or even some form of alphanumeric indicators, e.g., A1>C3. Moreover, a skilled artisan may readily utilize well-known empirical procedures for determining exemplary values to use for the server's preference values, threshold values, and dynamic preference values in any given work processing facility.

While the description has discussed servers as belonging to server pools, a skilled artisan will recognize that the servers need never really be identified as members of a particular server pool. In other words, the servers may merely receive work of one type or another, hence they may be thought of as belonging to a server pool for that work type even though the pool may not physically exist.

The invention is also applicable to systems in which work items are described with regard to both a work type and a service class. The service class may describe particular aspects of the work item while the work type describes the work item from the server's point of view. Accordingly, in some embodiment of the invention, the service class may influence the dynamic preference value and ultimately the composite preference value.

While the examples discussed above relate to calls in a call center, the invention is not limited to the processing of calls in a call center by servers, both human and/or robotic. The invention may be applied to the servicing of any form of work type and any form of service class. For example, the invention is equally applicable to the processing of electronic mail messages and video streaming tasks.

These and other changes can be made to the invention in light of the above detailed description. In general, in the following claims, the terms used should not be construed to limit the invention to the specific embodiments disclosed in the specification and the claims, but should be construed to include all hierarchical remediation methods and systems that operate in accordance with the invention. Accordingly, the invention is not limited by the disclosure, but instead its scope is to be determined by the following claims.

We claim:

1. A method for determining if a first agent should service work items of a first work type in a work processing facility, comprising:
    (a) an agent assignor selecting the first agent, wherein the first work type and/or a selected work item in the first work type has an associated first dynamic preference value and the first agent has an associated first agent preference value and first agent threshold value for the first work type and wherein the first dynamic preference value reflects the work processing facility's preference for processing of work items of the first work type in comparison to processing work items of work types other than the first work type;
    (b) the agent assignor determining, as a function of the first dynamic preference and first agent preference values, a first agent composite preference value for the first work type;
    (c) the agent assignor comparing the first agent composite preference value with the first agent threshold value, wherein the first agent threshold value measures the first agent's lack of proficiency in servicing the first work type and/or selected work item in the first work type;
    (d) the agent assignor, when the first agent composite preference value exceeds the first agent threshold value, finding the first agent to the qualified to service the first work type; and
    (e) the agent assignor, when the first agent composite preference value is less than the first agent threshold value, finding the first agent to be unqualified to service the first work type.

2. The method of claim 1, wherein the first dynamic preference value is a function of at least one of a service level value for the work type, a queue condition for the work type, an alarm condition for the work type, and an answer delay for the work type, a desired service level for the work type, a call abandonment rate for the work type, and an operator intervention value for the work type.

3. The method of claim 2, wherein the first dynamic preference value is a function of at least one of a service level value for the work type, a queue condition for the work type, and an answer delay for the work type.

4. The method of claim 1, wherein the first dynamic and agent preference values are nonzero and wherein the first agent composite preference value function is the sum of the first agent's preference value and the first dynamic preference value.

5. The method of claim 1, wherein the first dynamic and agent preference values are nonzero and wherein the first agent composite preference value is the product of the first agent preference value and the first dynamic preference value.

6. The method of claim 1, wherein the first agent preference value is a function of a personal desirability of the first agent for servicing the first work type.

7. The method of claim 1, wherein in step (d) the first agent is added by the agent assignor to a pool of agents qualified to service the first work type and in step (e) the first agent is not added by the agent assignor to the pool of agents.

8. The method of claim 1, wherein the first dynamic and agent preference values are nonzero and wherein the first dynamic preference value is a function of a first service level value for the first work type, the first service level value being measured over a selected period of time.

9. The method of claim 1, wherein the first dynamic and agent preference values are nonzero and further comprising:
(f) the agent assignor, when the first agent composite value is equal to the first agent threshold value, finding the first agent to be qualified to service the first work type.

10. The method of claim 1, further including the agent assignor not performing step (b) and finding the first agent to be qualified to service the first work type, when the first agent's preference value for the first work type is greater than the first agent threshold value for the first work type.

11. The method of claim 1, further comprising before step (b):
(f) determining a state of the work processing facility;
(g) based on the state of the work processing facility, selecting a first composite preference value function from among a plurality of possible preference value function, wherein the first composite preference value function is used to determine the first agent composite preference value.

12. The method of claim 11, wherein the state of the work processing facility is a function of a degree of achievement of one or more objectives.

13. The method of claim 12, wherein the one or more objectives comprise at least one of a selected degree of allocation of service level performance in excess of an associated goal, a selected degree of utilization of agents, a selected degree of dampening of fluctuations in service level attainment, a selected degree of dampening of fluctuations in server idleness, and a selected mode-specific behavior.

14. A computer readable medium comprising executable instructions to perform the steps of claim 1.

15. A system for determining whether a first agent should service work items of a first work type in a work processing facility, comprising:
agent assigning means for (a) selecting the first agent, wherein the first work type and/or a selected work item in the first work type has an associated first dynamic preference value and the first agent has an associated first agent preference value and first agent threshold value for the first work type and wherein the first dynamic preference value reflects the work processing facility's preference for processing of work items of the first work type in comparison to processing work items of work types other than the first work type; (b) determining, as a function of the first dynamic preference and first agent preference values, a first agent composite preference value for the first work type; (c) comparing the first agent composite preference value with the first agent threshold value, wherein the first agent threshold value measures the first agent's lack of proficiency in servicing the first work type and/or selected work item in the first work type; (d) when the first agent composite preference value exceeds the first agent threshold value, finding the first agent to the qualified to service the first work type; and (e) when the first agent composite preference value is less than the first agent threshold value, finding the first agent to be unqualified to service the first work type.

16. The system of claim 15, wherein the first dynamic preference value is a function of at least one a plurality of a service level value for the work type, a queue condition for the work type, an alarm condition for the work type, an answer delay for the work type, and a desired service level for the work type, a call abandonment rate for the work type, and an operator intervention value for the work type.

17. The system of claim 15, wherein the first dynamic preference value is a function of a plurality of a service level value for the work type, a queue condition for the work type, an answer delay for the work type, and a desired service level for the work type.

18. The system of claim 15, wherein the first dynamic and agent preference values are nonzero and wherein the first agent composite preference value function is the sum of the first agent's preference value and the first dynamic preference value.

19. The system of claim 15, wherein the first dynamic and agent preference values are nonzero and wherein the first agent composite preference value is the product of the first agent preference value and the first dynamic preference value.

20. The system of claim 15, wherein the first agent preference value is a function of a personal desirability of the first agent for servicing the first work type.

21. The system of claim 15, wherein in function (d) the first agent is added by the agent assigning means to a pool of agents qualified to service the first work type and in function (e) the first agent is not added by the agent assigning means to the pool of agents.

22. The system of claim 15, wherein the first dynamic and agent preference values are nonzero and wherein the first dynamic preference value is a function of a first service level value for the first work type, the first service level value being measured over a selected period of time.

23. The system of claim 15, wherein the agent assigning means, when the first agent composite value is equal to the first agent threshold value, finds the first agent to be qualified to service the first work type.

24. The system of claim 15, further including the agent assigning means not performing operation (b) and finding the first agent to be qualified to service the first work type, when the first agent's preference value for the first work type is greater than the first agent threshold value for the first work type.

25. The system of claim 15, further comprising:
composite preference evaluator means for determining a state of the work processing facility; and, based on the state of the work processing facility, selecting a first composite preference value function from among a plurality of possible preference value function, wherein the first composite preference value function is used to determine the first agent composite preference value.

26. The system of claim 25, wherein the state of the work processing facility is a function of a degree of achievement of one or more objectives.

27. The system of claim 26, wherein the one or more objectives comprise at least one of a selected degree of allocation of service level performance in excess of an associated goal, a selected degree of utilization of agents, a selected degree of dampening of fluctuations in service level attainment, a selected degree of dampening of fluctuations in server idleness, and a selected mode-specific behavior.

28. A system for determining whether a first agent should service work items of a first work type in a work processing facility, comprising:
an agent assignor operable to (a) select the first agent, wherein the first work type and/or a selected work item in the first work type has an associated first dynamic preference value and the first agent has an associated first agent preference value and first agent threshold value for the first work type and wherein the first dynamic preference value reflects the work processing facility's preference for processing of work items of the first work type in comparison to processing work items of work types other than the first work type; (b) determine, as a function of the first dynamic preference and first agent preference values, a first agent composite preference value for the first work type; (c) compare the first agent composite preference value with the first agent threshold value, wherein the first agent threshold value measures the first agent's lack of proficiency in servicing the first work type and/or selected work item in the first work type; (d) when the first agent composite preference value exceeds the first agent threshold value, find the first agent to the qualified to service the first work type; and (e) when the first agent composite preference value is less than the first agent threshold value, find the first agent to be unqualified to service the first work type.

29. The system of claim 28, wherein the first dynamic preference value is a function of at least one a plurality of a service level value for the work type, a queue condition for the work type, an alarm condition for the work type, an answer delay for the work type, and a desired service level for the work type, a call abandonment rate for the work type, and an operator intervention value for the work type.

30. The system of claim 28, wherein the first dynamic preference value is a function of a plurality of a service level value for the work type, a queue condition for the work type, an answer delay for the work type, and a desired service level for the work type.

31. The system of claim 28, wherein the first dynamic and agent preference values are nonzero and wherein the first agent composite preference value function is the sum of the first agent's preference value and the first dynamic preference value.

32. The system of claim 28, wherein the first dynamic and agent preference values are nonzero and wherein the first agent composite preference value is the product of the first agent preference value and the first dynamic preference value.

33. The system of claim 28, wherein the first agent preference value is a function of a personal desirability of the first agent for servicing the first work type.

34. The system of claim 28, wherein in operation (d) the first agent is added by the agent assignor to a pool of agents qualified to service the first work type and in operation (e) the first agent is not added by the agent assignor to the pool of agents.

35. The system of claim 28, wherein the first dynamic and agent preference values are nonzero and wherein the first dynamic preference value is a function of a first service level value for the first work type, the first service level value being measured over a selected period of time.

36. The system of claim 28, wherein the first dynamic and agent preference values are nonzero and wherein the agent assignor, when the first agent composite value is equal to the first agent threshold value, finds the first agent to be qualified to service the first work type.

37. The system of claim 28, further including the agent assignor not performing operation (b) and finding the first agent to be qualified to service the first work type, when the first agent's preference value for the first work type is greater than the first agent threshold value for the first work type.

38. The system of claim 28, further comprising:
a composite preference evaluator operable to determine a state of the work processing facility; and, based on the state of the work processing facility, select a first composite preference value function from among a plurality of possible preference value function, wherein the first composite preference value function is used to determine the first agent composite preference value.

39. The system of claim 38, wherein the state of the work processing facility is a function of a degree of achievement of one or more objectives.

40. The system of claim 39, wherein the one or more objectives comprise at least one of a selected degree of allocation of service level performance in excess of an associated goal, a selected degree of utilization of agents, a selected degree of dampening of fluctuations in service level attainment, a selected degree of dampening of fluctuations in server idleness, and a selected mode-specific behavior.

* * * * *